(12) United States Patent
Keenihan et al.

(10) Patent No.: US 10,651,785 B2
(45) Date of Patent: May 12, 2020

(54) CONNECTOR SYSTEM FOR PHOTOVOLTAIC ARRAY

(71) Applicant: DOW GLOBAL TECHNOLOGIES LLC, Midland, MI (US)

(72) Inventors: James R. Keenihan, Midland, MI (US); Leonardo C. Lopez, Midland, MI (US); Joseph A. Langmaid, Caro, MI (US); Shane Washburn, Oakland, CA (US); Darius Eghbal, Oakland, CA (US); Vijay Karthik Koneru, Santa Clara, CA (US); Kelvin L. Leung, Mountain View, CA (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 681 days.

(21) Appl. No.: 14/898,608

(22) PCT Filed: Jun. 4, 2014

(86) PCT No.: PCT/US2014/040848
§ 371 (c)(1),
(2) Date: Dec. 15, 2015

(87) PCT Pub. No.: WO2015/009362
PCT Pub. Date: Jan. 22, 2015

(65) Prior Publication Data
US 2016/0156307 A1 Jun. 2, 2016

Related U.S. Application Data

(60) Provisional application No. 61/856,110, filed on Jul. 19, 2013.

(51) Int. Cl.
*H02S 40/34* (2014.01)
*H02S 20/25* (2014.01)
*H02S 40/36* (2014.01)

(52) U.S. Cl.
CPC .............. *H02S 40/34* (2014.12); *H02S 20/25* (2014.12); *H02S 40/36* (2014.12); *Y02B 10/12* (2013.01)

(58) Field of Classification Search
CPC .......... H02S 40/25; H02S 40/26; H02S 40/36; Y02B 10/12; F24S 20/69
See application file for complete search history.

(56) References Cited

U.S. PATENT DOCUMENTS 7,387,537 B1 6/2008 Daily et al.
7,442,077 B2 10/2008 Peress et al.
(Continued)

FOREIGN PATENT DOCUMENTS

JP   2005-72101       3/2005
WO   2009/137347 A2   11/2009
(Continued)

OTHER PUBLICATIONS

International Search Report and Written Opinion dated May 11, 2014 for Application No. PCT/US2014/040848.
(Continued)

*Primary Examiner* — Daniel P Malley, Jr.

(57) ABSTRACT

A photovoltaic assembly comprising; (a) at least two photovoltaic components that are adjacent to each other in a first direction, each photovoltaic component comprising (i) a partial recess in communication with the partial recess in an adjacent photovoltaic component and (ii) one or more connector receptors aligned in a second direction which is non-parallel to the first direction; (b) a connector located at feast partially in the partial recess of the photovoltaic component and at least partially in the partial recess of the adjacent photovoltaic component so that the connector connects the photovoltaic component to the adjacent photovoltaic component, the connector comprising: (i) a flexible housing having a first end and a second end; (ii) one or more (Continued)

connection ports at the first end; (iii) one or more connection ports at the second end; and (iv) one more flexible electrical conductors that extend from the one or more connection ports at the first end to the one or more connection ports at the second end; wherein the connector is flexible so that the first end and the second end are movable relative to each other in a plane, out of the plane, or both; wherein the one or more connection ports at the first end and the one or more connection ports at the second end form a connection with the one or more connector receptors of the photovoltaic component and the adjacent photovoltaic component so that the connector electrically connects the photovoltaic component to the adjacent photovoltaic component.

23 Claims, 7 Drawing Sheets

(56) References Cited

U.S. PATENT DOCUMENTS

| | | | |
|---|---|---|---|
| 8,414,308 | B1 | 4/2013 | Meyers |
| 2006/0200980 | A1* | 9/2006 | Gagne .................. H05K 3/125 |
| | | | 29/846 |
| 2010/0105238 | A1 | 4/2010 | Good |
| 2010/0258157 | A1 | 10/2010 | Arai |
| 2010/0311262 | A1 | 12/2010 | Cours |
| 2011/0048507 | A1* | 3/2011 | Livsey .................. H02S 20/23 |
| | | | 136/251 |
| 2011/0183540 | A1 | 7/2011 | Keenihan et al. |
| 2011/0220183 | A1 | 9/2011 | Mills et al. |
| 2012/0118349 | A1 | 5/2012 | Keenihan |
| 2014/0000709 | A1 | 1/2014 | Langmaid et al. |

FOREIGN PATENT DOCUMENTS

| | | |
|---|---|---|
| WO | 2012/083337 A1 | 6/2012 |
| WO | 2012/154307 A2 | 11/2015 |
| WO | 2016/706926 | 5/2016 |

OTHER PUBLICATIONS

International Preliminary Report on Patentability dated Sep. 17, 2015 for Application No. PCT/US2014/040848.
First Office Action from the Patent Office of the People's Republic of China for Application No. 201480039908.1, dated Jan. 5, 2017.

* cited by examiner

CONNECTOR SYSTEM FOR PHOTOVOLTAIC ARRAY

STATEMENT OF GOVERNMENT RIGHTS

This invention was made at least in part with U.S. Government support under contact number DE-EE0004434 awarded by the Department of Energy. The U.S. Government has certain rights in this invention.

FIELD

The present teachings generally relate to an improved connector that electrically connects two adjacent photovoltaic components and allows for thermal expansion and movement of the two adjacent photovoltaic components relative to each other.

BACKGROUND

Typically, photovoltaic arrays are placed in an outdoor location so that the photovoltaic arrays are exposed to sunlight. The components of the photovoltaic array are subjected to varying conditions such as wind, rain, snow, ice, heat, and direct sunlight. The changes in temperature, humidity, and precipitation may cause the components of the photovoltaic array to expand, contract, move, or a combination thereof. Further, individual photovoltaic components making up the photovoltaic array may be directly connected to a support structure such as a roof of house or a building. The support structure including the photovoltaic components may expand, contract, move, or a combination thereof due to environmental changes, a mass, force or displacement being applied to the photovoltaic components, a mass, force or displacement being applied to the support structure, or a combination thereof such that stress and/or strain may be put on the connection between the two or more photovoltaic components, a terminal for connection of the photovoltaic components, or both. This strain may cause the connector to be dislocated from one or both of the photovoltaic components, a connector to be broken, a terminal to be broken, or a combination thereof so that less than all of the photovoltaic modules in the photovoltaic array produce power. Furthermore, if a connector, a photovoltaic component, or both fails and ceases to work and needs to be replaced the connectors may increase the length of time required to change the connector, the photovoltaic component, or both.

Examples of some known connectors may be found in U.S. Pat. Nos. 7,387,537; 7,442,077; and 8,414,308; U.S. Patent Application Publication No. 2010/0258157; Japanese Patent Application No. JP2005072101; and International Patent Application Nos. WO2009/137347 and WO2012/083337 all of which are incorporated by reference herein for all purposes.

It would be attractive to have a connector that electrically connects two or more adjacent photovoltaic components and provides a flexible connection so that the two or more adjacent photovoltaic components can move relative to each other while maintaining an electrical connection without the complexity of loose wires. It would be attractive to have a connector that is movable within a plane and out of the plane with the two adjacent photovoltaic components so that the electrical connection is maintained and the integrity of the connector, the terminals of the two or more photovoltaic components, or both are maintained. What is needed is a quick release connector that may be disconnected from all of the two or more photovoltaic components without damage to the photovoltaic components, the connector, or both and without undue manipulation of the connector, the photovoltaic components, or both.

SUMMARY

The present teachings meet one or more of the present needs by providing: photovoltaic assembly comprising: (a) at least two photovoltaic components that are adjacent to each other in a first direction, each photovoltaic component comprising (i) a partial recess in communication with the partial recess in an adjacent photovoltaic component and (ii) one or more connector receptors aligned in a second direction which is non-parallel to the first direction; (b) a connector located at least partially in the partial recess of the photovoltaic component and at least partially in the partial recess of the adjacent photovoltaic component so that the connector connects the photovoltaic component to the adjacent photovoltaic component, the connector comprising: (i) a flexible housing having a first end and a second end; (ii) one or more connection ports at the first end; (iii) one or more connection ports at the second end; and (iv) one or more flexible electrical conductors that extend from the one or more connection ports at the first end to the one or more connection ports at the second end; wherein the connector is flexible so that the first end and the second end are movable relative to each other in a plane, out of the plane, or both; wherein the one or more connection ports at the first end and the one or more connection ports at the second end form a connection with the one or more connector receptors of the photovoltaic component and the adjacent photovoltaic component so that the connector electrically connects the photovoltaic component to the adjacent photovoltaic component.

One possible embodiment of the present teachings include: a method of assembling a photovoltaic component comprising: (a) locating a photovoltaic component at a desired location; (b) locating a second photovoltaic component adjacent to the photovoltaic component; (c) aligning a partial recess in the photovoltaic component with a partial recess in the second photovoltaic component; (d) obtaining a connector comprising: (i) a flexible housing having a first end and a second end; (ii) one or more connection ports at the first end; (iii) one or more connection ports at the second end; and (iv) one or more electrical conductors that extend from the one or more connection ports at the first end to the one or more connection ports at the second end; wherein the flexible housing assembly is flexible so that the first end and the second end are movable relative to each other in a plane, out of the plane, or both; and wherein the first end and the second end of the connector are adjacent each other in a second direction; (e) locating the first end of the connector in the partial recess of the photovoltaic component and the second end of the connector in the partial recess of the second photovoltaic component; and (f) forming an electrical connection, a physical connection, or both between the photovoltaic component and the second photovoltaic component.

The present teachings provide a connector that electrically connects two or more adjacent photovoltaic components and provides a flexible connection so that the two or more adjacent photovoltaic components can move relative to each other while maintaining an electrical connection without the complexity of having loose wires. The present teachings provide a connector that is movable within a plane and out of the plane with the two adjacent photovoltaic components so that the electrical connection is maintained and the integrity of the connector, the terminals of the two or more photovoltaic components, or both are maintained. What is needed is a quick release connector that may be disconnected from all of the two or more photovoltaic components without damage to the photovoltaic components, the connector, or both and without undue manipulation of the connector, the photovoltaic components, or both.

DETAILED DESCRIPTION

Figure 1:
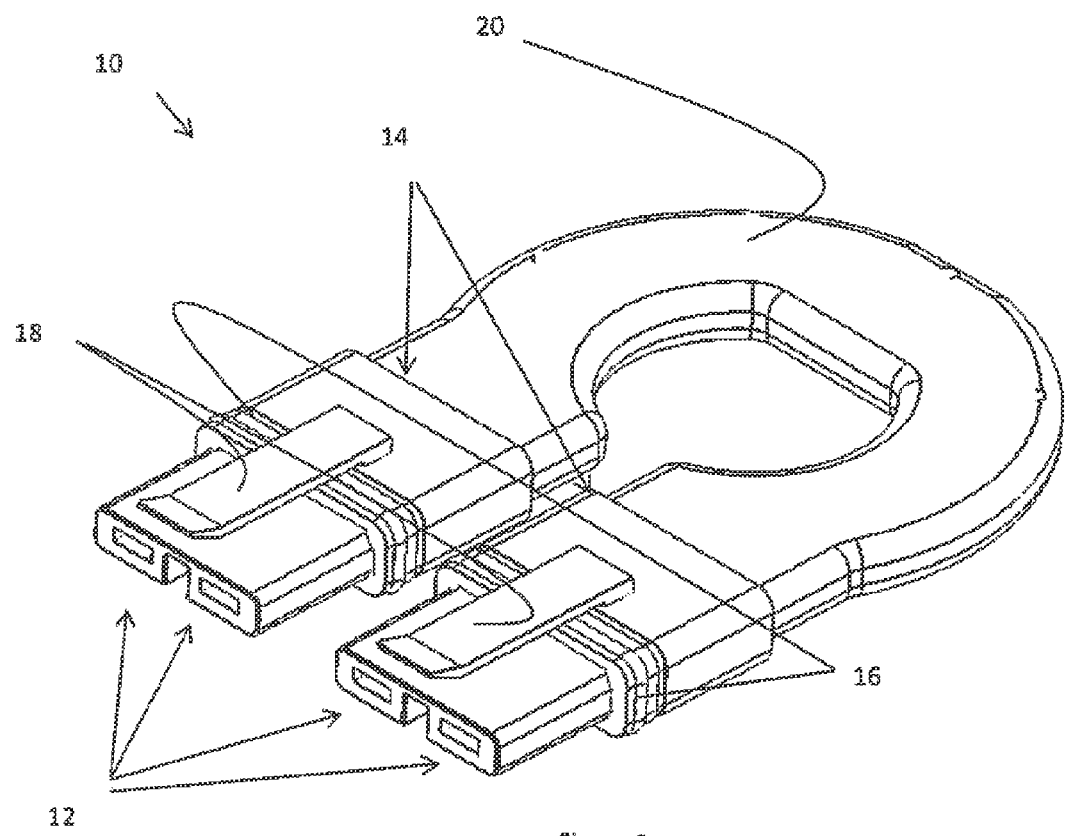
FIG. 1 illustrates a perspective view of a connector.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

A plurality of photovoltaic modules and/or photovoltaic components of the teachings herein are combined together to form a photovoltaic array. The photovoltaic array collects sunlight and converts the sunlight to electricity. Generally, each of the photovoltaic modules may be individually placed in a structure that houses all of the photovoltaic modules forming all or a portion of a photovoltaic array (sometimes referred to as a solar array). The photovoltaic modules of the teachings herein may be used with a housing that contains all of the individual photovoltaic modules that make up a photovoltaic array. Preferably, the photovoltaic array taught herein is free of a separate structure that houses all of the photovoltaic modules that make up a photovoltaic array. More preferably, each individual photovoltaic module may be connected directly to a structure and each of the individual photovoltaic modules is electrically connected together so that a photovoltaic array is formed (i.e., is a building integrated photovoltaic (BIPV)). Each of the photovoltaic components, and preferably each row of photovoltaic component in the photovoltaic array may be adjacent to each other in a first direction. For example, if a photovoltaic array includes three rows of photovoltaic components and each row includes 5 photovoltaic components each of the rows and photovoltaic components within the rows may extend along a first direction. The first direction may be aligned with the slope of a roof. Preferably, the first direction is a transverse direction (i.e., perpendicular to the slope of the roof). A portion of each of the photovoltaic modules may overlap a portion of an adjacent photovoltaic module, an adjacent photovoltaic component, or both forming a shingle configuration and/or a double overlap configuration on a support structure so that the photovoltaic modules may be used as roofing shingles.

The photovoltaic components of the photovoltaic array may be any photovoltaic component that collect sunlight to generate electricity, any component that transfers power throughout the photovoltaic array, photovoltaic module, any component that assists in generating energy from sunlight, an integrated flashing piece, an inverter connection, an inverter, a connector, or a combination thereof. Preferably, the photovoltaic components are the photovoltaic module, an integrated flashing piece, or both. More preferably, when connecting two photovoltaic components at least one of the photovoltaic components is a photovoltaic module. The photovoltaic components may be connected together by a connector that is discrete from each photovoltaic component, integrally connected to one photovoltaic component and separate from another photovoltaic component, or both. Preferably, the photovoltaic components include one or more connector receptors, and preferably two or more connector receptors so that two or more adjacent and/or juxtaposed photovoltaic components may be electrically connected together. For example, the two adjacent photovoltaic components may be located in close proximity to each other (i.e., a spacer, gap, shim, or the like may be located between the two adjacent photovoltaic components) so that a connector may span between and electrically connect the two adjacent photovoltaic components.

The one or more connector receptors may be any feature and/or device on a photovoltaic component where a connector may electrically connect the photovoltaic component to one or more adjacent photovoltaic components. The connector receptors may be configured on a side of the photovoltaic component, on an edge of the photovoltaic component, a surface on virtually any side of the photovoltaic component, or a combination thereof. Preferably, the connector receptors may be located on a side of a photovoltaic component in an edge region of each photovoltaic component. More preferably, the connector receptors may be located within an edge region and on a side of the photovoltaic component that faces the sun, the installer, faces the connection structure, or a combination thereof when connected to a support structure. The connector receptors of each photovoltaic module may be generally oriented in the same direction; the connector receptors may be generally oriented along a line (i.e., pointed away from each other in the same plane); the connector receptors of one photovoltaic component may be located alongside a connector receptor of another connector receptor; the connector receptors may be staggered; angled towards each other, away from each other; or a combination thereof. Preferably, the connection receptors do not point towards each other in a transverse direction (i.e., are not located perpendicular to the slope of a roof so that two adjacent connection receptors face each other). The connection receptors may be parallel, non-parallel, non-coplanar, coplanar, have an intersecting angle (e.g., a line extending from a connection point of the connection receptors if extended, will intersect a line extending from another connection point); have a diverging angle (i.e., a line extending from a connection point of the connection receptor is extended the lines will never intersect); be located linearly along the photovoltaic components, be located non-linearly along the photovoltaic components, at an angle relative to the first direction of the photovoltaic components (i.e., in a second direction), or a combination thereof. Preferably, the connection receptors are shaped and oriented so that the connection receptors may be interfaced with the connector assembly substantially simultaneously. The connector receptors may be parallel and face the same direction, parallel and facing the opposite direction, non-parallel generally facing the opposing photovoltaic component; non-parallel generally facing away from the opposing photovoltaic component, or a combination thereof. The second direction may be any angle so that the connector receptors are not located along a line, are not linearly located relative to each other, or both. The angle between second direction and the first direction may be 10 degrees or more, 20 degrees or more, 30 degrees or more, or 45 degrees or more. The angle between the second direction and the first direction may be less than about 180 degrees, about 165 degrees or less, about 145 degrees or less, about 125 degrees or less, about 105 degrees or less, or about 90 degrees or less. Preferably, the angle between the first direction and the second direction is from about 45 degrees to 90 degrees and preferably from about 60 degrees and 90 degrees. The connector receptors may include one or more connection points where a connector may plug so that power is transferred from one photovoltaic component to another photovoltaic component.

The one or more connection points may be a female portion, a male portion, or a combination of both that forms an electrical connection with a connector for transporting power between or through photovoltaic components. The connection points may be any component that extends into a connection port, around a connection port, connects to a terminal, or a combination thereof. Preferably, the connection points may be an opposite structure to that of the connector such that the connection points extend into the connector, a portion of the connector extends into the connection points, or a combination of both. More preferably, the connection points are all male or all female. The one or more connection points may point in any direction so that the connector may form an electrical connection for transferring power from one photovoltaic component to another photovoltaic component. Preferably, the one or more connections points of each of the photovoltaic components point in the same direction (e.g., all of the connection points are directed up the slope of the roof and/or down the slope of the roof). More preferably, the one or more connection points face along the slope of the roof line (i.e., longitudinal direction) so that movement of the one or more photovoltaic components along the roof (i.e., transverse direction) cannot disconnect the connector from the one or more connection points. The one or more connection points of a first photovoltaic component may be located side by side with the one or more connection points of an adjacent photovoltaic component, the connection points may be juxtaposed, the connection points may be staggered, the connection points may be offset, the connection points may be coplanar, the connection points may extend at an angle towards each other, at an angle away from each other, or a combination thereof. The one or more connection points may be on a surface of the photovoltaic component. Preferably, the one or more connection points are located within a partial recess or a complete recess within a photovoltaic component. For example, the photovoltaic component may include a top surface forming a plane and the connection points of the connector receptors may be located below the plane, in a recess, or both.

The recess may be any part of the photovoltaic component where a connector, a different photovoltaic component, or both may be placed so that all or a portion of the connector, the different photovoltaic components, or both are planar with an outer surface of the photovoltaic component, located below an outer surface of the photovoltaic component, located below a plane of the outer surface and covered, or a combination thereof. The recess may be any part of the photovoltaic component where a portion of the photovoltaic component is removed, a depression is formed within the photovoltaic component, a molded depression is formed that extends below an outer surface of the photovoltaic component, or a combination thereof. Preferably, each photovoltaic component includes at least a partial recess and the partial recess is located in an edge region of the photovoltaic component. More preferably, the partial recess or the complete recess (e.g., when two photovoltaic components are connected) may be located outside of the active portion of the photovoltaic component (i.e., the portion that is exposed to sunlight). Most preferably, each partial recess of each photovoltaic component when put together may form a complete recess and the connector may fit within the complete recess and electrically connect, physically connect, or both the two adjacent photovoltaic components. The recess may be configured so that the recess may be covered and so that a substantially fluid fight seal is formed that protects the contents within the recess. The recess may include one or more latching mechanisms.

The one or more latching mechanisms may be any device and/or feature that forms a physical connection with one or both ends of the connector, with one or more connection features of the connector, or both. The one or more latching mechanisms may assist in creating an electrical connection, a physical connection, or both. The one or more latching mechanisms may be a detent, a latch, a depression, a projection, a clip, a male piece, a female piece, the like, or a combination thereof. The latching mechanism may be any device and/or feature that when connected requires a user interface and/or tool to remove the connection, produces a connection with sufficient force that a user interface and/or tool is required to remove the connection, or both. For example, a screwdriver may be required to disconnect the latching mechanism from a locking feature, or vice versa. In another example, a user interface may be present that requires the user to perform a detachment step in order to disengage the latching mechanism. The latching mechanism may produce a connection with sufficient force so that inadvertent disconnection is substantially prevented and/or eliminated. The latching mechanism may produce a connection with sufficient force so that partial engagement is not achieved. For example, if a user pushes the locking feature partially into contact with the latching mechanism and a connection is not achieved the locking feature and/or latching mechanism may complete the connection so that a connection is formed, the locking feature and/or latching mechanism may remove the partial connection so that no connection is formed, or both. The latching mechanism may produce a signal when a connection is formed (e.g., an audible signal, a haptic signal, the like, or a combination thereof). The latching mechanism may create a removable connection with the connector so that the connector is retained within the recess, but the connector may be removed upon release of the latching mechanism. The latching mechanism may cover all or a portion of the connector to form a connection; the latching mechanism may be connected to a top, bottom, side, edge, internal feature, or a combination thereof of the connector to form a connection; the latching mechanism may extend into a part of the connector; or a combination thereof. For example, the internal feature of the connector may be a detent or a movable latch that assists in forming a mating connection between the latching mechanism and the connector. The latching mechanism may include one or more holes, connection points, arms, locking mechanisms, teeth, through holes, detents, or a combination thereof for forming a mechanical connection with a locking feature, a connector, or both. One of the latching mechanisms may be a locking portion connector.

The one or more locking portion connectors may be any mechanism that forms a locked connection with a flexible region and/or lock portion, that receives a flexible region and/or lock portion, or both. The one or more locking portion connector may extend into, around, over, or a combination thereof a locking portion so that a connector is retained within a recess, within a photovoltaic component, or both. The one or more locking portion connectors may be located so that at least one locking portion connector is aligned with an apex of a connector. The locking portion connector may perform one or more of the functions of the latching mechanism, the locking feature, or both discussed herein. The locking portion connector may be located at an end of the connector, a side of the connector, proximate to the locking portion of the connector, or a combination thereof. The connector preferably may be located within a recess, proximate to a recess, be part of a recess, or a combination thereof.

The recess may include one or more fluid releases. The one or more fluid releases may be any part of the recess, the photovoltaic component, or both that allows fluid to exit the recess, the photovoltaic component, or both. The one or more fluid releases may be a hole, a slot, a low spot, a passage, a channel, or a combination thereof that allows fluid to flow out of the recess so that the connector, a connection between the connector and the photovoltaic component, or both remain substantially dry, are substantially free of contact with a standing fluid, or a combination thereof. Preferably, the fluid releases are a series of holes in the recess of a photovoltaic component that allow water to exit the recess so that the connector is not located in standing water.

The connector may be any device and/or feature that electrically connects, physically connects, or both two or more adjacent photovoltaic components. The connector may be any shape and size so that the connector may be a quick release and/or quick attach connector. The connector may be configured so that the connector may be connected and/or removed without manipulation to any other photovoltaic components of the teachings herein. For example, the connector may be disconnected and removed and/or aligned and connected from one or more photovoltaic components without having to reorient the photovoltaic components relative to each other, the connector, or both. The connector may be quick release and quick attach so that upon disconnection and connection of the locking feature from the latching mechanism or vice versa the connector may be removed from a photovoltaic array and a new connector be installed. The connector may be any shape and size so that the connector has two adjacent connection ports that extend in the same direction so that a connection is formed between two or more photovoltaic components. The two adjacent connection ports may be coplanar, staggered, offset, side by side, may mirror the location of the connection points, or a combination thereof. The connector may have two halves and the two halves may be substantially symmetrical and/or substantially identical on two sides of a line that bisects the connector along its length. The connector may be generally "U" shaped, generally "V" shaped, generally "M" shaped, generally "W" shaped, may be generally square or rectangular with a slit that extends partially through a central region so that two discrete portions are formed; generally "J" shaped, generally "S" shaped, or a combination thereof. The ends of the connector may extend in the same direction, at an angle towards each other, at an angle away from each other, or a combination thereof. Preferably, the connector includes at least two discrete ends that project in the same direction. More preferably, the connector includes two discrete ends that project in the same direction and are movable within a plane (e.g., towards and away from each other or left and right); out of plane (e.g., up and down); a combination of directions therebetween (e.g. diagonally), or a combination thereof. For example, the two discrete ends are located within substantially the same plane and extend substantially in the same direction to form a connection between two adjacent photovoltaic components (e.g., two photovoltaic modules, one photovoltaic module and an integrated flashing piece). Preferably, the connector is shaped and oriented so that the discrete ends of the connector may be terminated substantially simultaneously. The two or more discrete ends may extend from a flexible housing.

The flexible housing may form a body that the two or more discrete ends extend from. The flexible housing may cover all or a portion of the conductors. Preferably, flexible housing is a cover that at least partially surrounds some of the internal components (e.g., conductors, connectors, terminals, locating features, or a combination thereof) of the connector, completely covers some of the internal components of the connector, or both. The flexible housing may be any part of the connector that allows the two discrete ends to move relative to each other as discussed herein. The flexible housing may be sufficiently flexible so that the flexible housing moves when in a connected state but includes enough rigidity and/or stiffness so that the connector may be moved into the connection state by a user gripping and moving the connector via a point on the housing. For example, as the connector is moved into the recess and the locking feature connects to the latching mechanism the stiffness may be sufficient to overcome the forces so that an electrical connection, a physical connection, or both are formed. The flexible housing may be an injection molded piece, a formed piece, an insulator, or a combination thereof. The flexible housing may be made of any material that forms a substantially water resistant cover so that the internal components of the connector are protected from fluids. The flexible housing may be made of any material that is elastically deformable so that the flexible housing may move while connected to two adjacent photovoltaic components. The flexible housing may be made of a natural material, a synthetic material, plastic, an elastomer, rubber, a polymer, a thermoplastic, a phenolic, epoxy, nylon, polyethylene, polystyrene, or a combination thereof. The flexible housing may be made of a rigid material, include a rigid material, include structural supports in a direction along the connector, or a combination thereof and the flexible housing may include one or more through holes, one or more flexible regions, or both.

The flexible housing may include one or more through holes that extend through the flexible housing so that two or more discrete ends are formed. The through hole may extend through any part of the flexible housing so that discrete ends are formed. The through hole may be any shape and size so that the discrete ends may be movable relative to each other. The through hole may be round, oval, symmetrical, asymmetrical, have one flat wall and the remainder be generally arcuate, have more than one flat wall, square, rectangular, generally "D" shaped, or a combination thereof. The through hole may be located in a central region of the flexible housing, across from an apex, proximate to a flexible region, proximate to a locking portion, or a combination thereof.

The locking portion of the flexible housing may be any portion that assists in forming a connection with the photovoltaic component, a locking portion connector, a recess, or a combination thereof. The locking portion may be located at any location along the flexible housing so that the locking portion assists in connecting the connector to a photovoltaic component. The locking portion may be an absence of material, a thinner piece of material, a symmetrical shape in the flexible housing, an asymmetrical shape in the flexible housing, or a combination thereof. The locking portion may be configured so that a locking portion connector may extend over, around, Preferably, the locking portion is located at the apex of the flexible housing and the connector. The locking portion may be any part of the flexible housing and/or connector that may form a connection with a locking portion connector so that the locking portion assists in retaining the connector within the photovoltaic component. The locking portion and the locking portion connector may form a complementary connection. Preferably, the locking portion is not flexed when in contact with the locking portion connector; however, the locking portion may be flexed during contact with the locking portion connector. The locking portion may be a flexible region.

The one or more flexible regions may be any part of the flexible housing that allows the flexible housing to be movable, forms a flexible joint within the flexible housing, forms a connection point for the connector, or a combination thereof. The one or more flexible regions may be a thinner region in the flexible housing so that the flexible housing flexes in the flexible regions. The flexible regions may be a joint, a hinge, a recess, or a combination thereof. The flexible regions may be located along the flexible housing of the connector. The one or more flexible regions may be located sporadically along the flexible housing or located evenly along the flexible regions. The one or more flexible region may be located at an apex between the two discrete ends of the connector. The one or more flexible regions may be a locking portion so that when installed in the photovoltaic component the flexible regions form a connection with a corresponding structure (i.e., a locking portion connector) of the photovoltaic component, the recess in the photovoltaic component, or both. The one or more flexible regions may be generally arcuate, have a partial thickness of the flexible housing, be square shaped, a half circle, or a combination thereof. The one or more flexible regions may be a relief.

The relief may be any device and/or feature that allows the two or more discrete ends to move relative to each other. The relief may be an expansion portion, a contraction portion, or both. The relief may be accordion shaped, undulating, include additional length of conductor, be stretchable, have one or more folded segments, or a combination thereof. The relief may extend in plane, along a line allow the two or more discrete ends to extend in a plane, allow the two or more discrete ends to extend out of the plane, extend along a first direction, or a combination thereof. The flexible housing may include both a relief and one or more flexible regions. A relief may be used instead of a flexible housing or vice versa. The one or more flexible regions, one or more reliefs, or both may assist the one or more connection ports in each of the two or more discrete ends in forming a connection with two or more photovoltaic components, remaining in connection with two or more photovoltaic components, or both.

The one or more connection ports may be any device and/or feature that may form a connection with one or more photovoltaic components. Preferably, the one or more connection ports are an end of each of the ends of the connector that come into contact with the photovoltaic components so that a connection is formed between the two adjacent photovoltaic components. The one or more connection ports may be an opening in the connector, the terminal covers, or both that allows a portion of the photovoltaic component to enter the connector forming a connection, a portion of the connector to extend into a portion of the photovoltaic component, or a combination of both. The one or more connection ports may be an opening in a terminal cover that exposes a conductor, a terminal, or both to a connector receptor for forming a connection between two or more photovoltaic components.

The terminal covers may be any device and/or feature that covers all or a portion of the connector, the ends of the connector, the internal components, a terminal, or a combination thereat. The terminal cover may be any device and/or feature that forms a seal with the flexible housing, forms a sealed connection with the one or more connector receptors, or both. The terminal cover may be a rigid cover that protects the internal components, the terminals, the conductors, or a combination thereof. The terminal cover may be flexible so that when a connection is formed the terminal cover is deformed by the connector receptor so that a sealed connection is formed. Preferably, the terminal cover is substantially rigid. The terminal covers may sufficiently cover one or more conductors, one or more conductors, or both so that the connector is safe to the touch; a body part of the user cannot contact a terminal, a conductor, or both; a user is insulated from contacting a part of the connector that is electrically powered; or a combination thereof. The terminal cover may have one or more connection ports that are sufficiently small so that a user cannot contact an electrically powered part but not so small that an electrical connection cannot be formed. Preferably, the terminal cover protects the conductors and terminals from direct contact by a user. The terminal cover may be flat on all sides, may include a track on one or more sides and/or edges, may include a locating feature (e.g., a piece that projects out) on one or more sides and/or edges, may include an alignment feature that corresponds with a feature of the photovoltaic component and/or recess, or a combination thereof so that the terminal cover assists in forming a proper electrical connection during installation, the terminal covers can only be installed in one way, or both. The terminal cover may be made of the same material or a different material as the flexible housing. The terminal covers may partially and or fully surround an end of the connector, the connection port, or both. The terminal cover may include one or more locking features.

The locking feature may be any device and/or feature that assists in forming an electrical connection, a physical connection, or both between the connector and one or more photovoltaic components. The locking feature may be an integral part of the terminal cover, a discrete part, a removable piece, or a combination thereof. The locking feature may form a connection with a latching mechanism of the photovoltaic component. The locking feature may be a complementary device and/or feature to the latching mechanism. The locking feature may be any device and/or feature that is an opposite to that of the latching mechanism. For example, if the latching mechanism is a male piece then the locking feature is a female piece or vice versa. The locking feature may grip a portion of the photovoltaic component and may form a connection without being connected to the latching mechanism. The locking feature may be any device and/or feature that when connected requires a tool and/or user interface to remove the connection, produces a connection with sufficient force that a tool and/or user interface is required to remove the connection, or both. For example, a screwdriver may be required to disconnect the locking feature from a latching mechanism, or vice versa. The locking feature may produce a connection with sufficient force so that inadvertent disconnection is substantially prevented and/or eliminated. The locking feature may produce a connection with sufficient force so that partial engagement is not achieved. For example, if a user pushes the locking feature partially into contact with the latching mechanism and a connection is not achieved the locking feature and/or latching mechanism may complete the connection so that a connection is formed, the locking feature and/or latching mechanism may remove the partial connection so that no connection is formed, or both. The locking feature may produce a signal when a complete lock is formed (e.g., an audible signal, a haptic signal, or both). Any of the features discussed herein for a locking mechanism may be used for the locking feature. The locking feature may assist in connecting a seal to the terminal cover, retaining a seal on the terminal cover, or both.

The seal may be any device and/or feature that covers all or a portion of the terminal cover, is located within the terminal cover, or both and prevents fluids from entering the terminal cover, entering a connection between the terminal cover and the flexible housing, entering a connection between the connector receptor and the terminal cover, forms an insulator around the discrete ends of the connector, or a combination thereof. The seal may be rigid, flexible, expandable, contractible, may release a dielectric gel or potting agent (e.g., an epoxy and/or adhesive), or a combination thereof. For example, the seal may include a dielectric gel and upon installation the dielectric gel and/or potting agent maybe released forming a seal between the photovoltaic component and the connector. Preferably, the seal may be a piece that is expandable and contractible so that when an end of the terminal cover extends into the connector receptor the seas contracts and forms a fixed connection therebetween. The seal may extend around an outer periphery of the terminal cover, the seal may be an internal component in the terminal cover, or both. The seal may be an integral part of the terminal cover or a discrete part. The seal may be located within the connector receptor, within the photovoltaic module, proximate to the connection points, within the photovoltaic module so that the seal surrounds a portion of the connector when the connector is inserted into the photovoltaic components, or a combination thereof. The seal, terminal cover, or both may cover the one or more terminals, provide a fluid barrier around the one or more terminals, or both.

The one or more terminals may be any part of the connector that forms an electrical connection with the connector receptor so that two or more adjacent photovoltaic components are electrically connected, so that power is transferred from one photovoltaic component to another photovoltaic component, so that a connection is formed between a conductor in the connector and a conductor within the photovoltaic component, or a combination thereof. The one or more terminals may be an and of a conductor. The one or more terminals may be a part of the conductor that extends into the connector receptor, that a portion of the connector receptor extends into, or both so that an electrical connection is formed. The one or more terminals may have an end that grips the conductor, an end that grips a portion of the connection receptor, or both. The terminals may be integrally formed with the electrical conductors, may be discrete and added to the electrical conductors, or both. The terminal may be a male component, a female component, or both. The one or more terminals may be a discrete part, an integral part, or a combination of both of the electrical conductor.

The one or more electrical conductors may be any device and/or feature that extends between two or more locations so that power is transferred from a first location to a second location. The one or more electrical conductors may be any device and/or feature inside of a connector that assists in transferring electricity between two or more photovoltaic components. Preferably, the connector includes two conductors and the two conductors extend from a first end of the connector to the second end of the connector so that an electrical connection is formed and electricity can flow from the first end of the second end or vice versa. The electrical conductors may have any configuration so long as electricity flows through the one or more electrical conductors from a first photovoltaic component to a second photovoltaic component. The electrical conductors may be flat, round, oval, twisted, straight, include one arcuate portion, include a plurality of arcuate portions, include one or more bends, or a combination thereof. The electrical conductors may be made of any material that conducts electricity. Preferably, the electrical conductors are made of metal. More preferably, the electrical conductors are made of copper, brass, bronze, tin, silver, or a combination thereof. The electrical conductors may be insulated, non-insulated, or a combination of both. The electrical conductors may have two or more connection points, one or more integral parts, one or more parts that are connected, or a combination thereof. The electrical conductors have a height and may have a width (i.e., the conductor is not round). The width of the electrical conductor may be any width so that the electrical conductor may be moved within a plane, out of a plane, or both and the one or more electrical conductors form an electrical connection so that electricity is transferred between two or more photovoltaic components. The width of the one or more electrical conductors may be in one plane as the electrical conductor extends from a first end to a second end. The width of the electrical conductor may extend out of plane (i.e., twist) as the electrical conductor extends from the first end to the second end of the connector. For example, the electrical conductor may begin at a first end so that the width is flat and proximate to a terminal.

As the electrical conductor extends away from the terminal the electrical conductor may twist so that the electrical conductor is on edge, and then as the electrical conductor approaches the second end of the connector the electrical conductor twists back so that the width is flat. The twist of the electrical conductor may occur at any location along the length of the electrical conductor. Preferably, the twist of the electrical conductor occurs before and/or after any arcuate portions, curves, bends, or a combination thereof so that the electrical conductor is on edge as it extends through the arcuate portions, curves, bends, or a combination thereof. The electrical conductor may be generally planar proximate to the terminals. The twist may be at any location within the connector so that a low profile location is created within the connector, the connector interface, the terminal covers, or a combination thereof; the twist may make the entire connector low profile; the twist may provide a low profile to the connector at locations that extend out of the photovoltaic component; or a combination thereof. The twist as discussed herein may be any amount of rotation of the electrical conductor so that as the electrical conductor forms any angle, extends through any flexible region, or both the twist imparts flexibility into the electrical conductor, the electrical conductor is aligned in a flexible direction, or both. The electrical conductor may be twisted 15 degrees or more, 30 degrees or more, 45 degrees or more, preferably 60 degrees or more, or more preferably 75 degrees or more. The electrical conductor may be twisted 150 degrees or less, 135 degrees or less, 115 degrees or less, or preferably about 105 degrees or less. The one or more electrical conductors may include one or terminal locating features.

The terminal locating feature may be any device and/or feature that holds one or more terminals, locates one terminal proximate to an adjacent terminal, locates one or more terminals within a flexible housing, locates one or more terminals within a terminal cover, aligns one or more terminals relative to each other, or a combination thereof. The terminal locating features may locate one end (i.e., terminal) of one or more conductors relative to another end (i.e., terminal) of one or more conductors. Preferably, the terminal locating features locate the same end of two or more conductors relative to each other so that the two or more terminals are maintained in an electrically isolated manner. The terminal locating features may locate the electrical conductors so that a first end of the electrical conductors is movable relative to a second end of the electrical conductors. The terminal locating features may locate the electrical conductors so that the first end of one electrical conductor is fixed relative to the first end of an adjacent electrical conductor. Each terminal locating feature may include a single electrical conductor and preferably multiple electrical conductors. The terminal locating features may locate the conductors in a manufacturing device, in a mold, in a housing, or a combination thereof. The terminal locating features may locate the terminals so that the terminals have a set configuration that matches that of the connector receptor, so that the terminals are substantially sealed and protected from the environment (e.g., humidity, fluids, dirt, etc.), so that the terminals are isolated from each other, or a combination thereof. The terminal locating features may be used in conjunction with a conductor locating feature, located adjacent to the conductor locating features, or both.

The conductor locating features may be any device and/or feature that assists in maintaining the twist of the one or more electrical conductors, assists in maintaining electrical isolation between two adjacent electrical conductors, locating the electrical conductors within the flexible housing, locating the electrical conductors within a manufacturing device and/or feature, or a combination thereof. The conductor locating features may be located along the conductors so that the conductors are aligned with the terminals, aligned with the ends of the connector, or both. The conductor locating features may be spaced apart, intermittently spaced, staggered, located on straight portions, located on arcuate portions, or a combination thereof. The conductor locating features may be located on a single electrical conductor, may be located on multiple electrical conductors, or both. The terminal locating feature, the conductor locating feature, or both may be made of any material so that the terminals, the electrical conductors or both are located relative to each other, encased, spaced part, electrically isolated, or a combination thereof. The terminal locating feature, the conductor locating feature, or both may be made of a natural material, a synthetic material, a polymer, an elastomer, a flexible material, a rigid material, an epoxy based material, a polyester, polyamide, polyolefin, phenoxy resin, acetal, acrylic polymer, fluorine containing polymers, chlorine containing polymers, their copolymers, or a combination thereof. The terminal locating feature, the conductor locating feature, or both may include one or more locating features for assisting in locating the one or more electrical conductors within the flexible housing, the terminal covers, or both.

The one or more locating features may be any part of the terminal locating feature, the conductor locating feature, or both that locate the device and/or feature within a mold, a manufacturing device, a flexible housing, or a combination thereof. The locating features may be any feature that aligns all of the internal components of the connector so that all of the connectors have a standard configuration. The locating features may be a dimple, a recess, a hole, a tab, a projection, a depression, or a combination thereof. The locating features may be located at any location on the terminal locating feature, the conductor locating feature, or both so that the internal components are aligned during manufacture, aligned within the flexible housing, or both.

A method may be used to assemble a photovoltaic array. The method may include one or more of the following steps performed in virtually any order. Two or more photovoltaic components may be located proximate to each other. The photovoltaic components may be connected directly to a support structure, a roof structure, a roof deck, a roof of a building, a roof of a house, or a combination thereof via a fastener (e.g., nail, screw, bolt, the like, or a combination thereof). The two or more photovoltaic components may be aligned relative to each other, the partial recesses in the photovoltaic components may be aligned relative to each other, or both. A connector of the teachings herein may be aligned with the partial recesses of the photovoltaic components, the full recess formed when the two or more photovoltaic components are aligned, or both. The connector may be flexed so that the connector aligns with one or features (e.g., recess, latching mechanism, connector receptors, connection points, or a combination thereof) of the photovoltaic modules. The flexible housing may be moved so that the flexible housing assists in producing an electrical connection, a physical connection, or both. A first end of the connector may be located relative to a first photovoltaic component and a second end of the connector may be located relative to a second photovoltaic component. An electrical connection may be formed by moving the connector into a recess, a physical connection may be formed by moving the connector into a recess, or both. Moving both the first end and the second end simultaneously in a first direction so that both ends form a connection (e.g., physical, electrical, or both) simultaneously. The locking feature, the latching mechanism, or both may be moved so that a physical connection is formed between the locking feature and the latching mechanism. The locking feature, the latching mechanism, or both may be actuated by a hand, a tool, or both so that the locking feature, the latching mechanism, or both are disconnected, the connector may be removed, or both. The connector may be removed from the photovoltaic array without disturbing any of the photovoltaic components, moving any other photovoltaic components, moving any photovoltaic components relative to each other, or a combination thereof.

FIG. 1 illustrates a perspective view of a connector 10, The connector 10 includes a flexible housing 20 that includes a terminal cover 14 on each end. The terminal covers 14 include a locking feature 18 for connecting the connector to two adjacent photovoltaic components (not shown). The terminal cover 14 includes connection ports 12 on the ends for forming an electrical connection, and the terminal covers 14 include a seal 16 for assisting in sealing the connection between the terminal cover 14 and the adjacent photovoltaic components.

Figure 2:
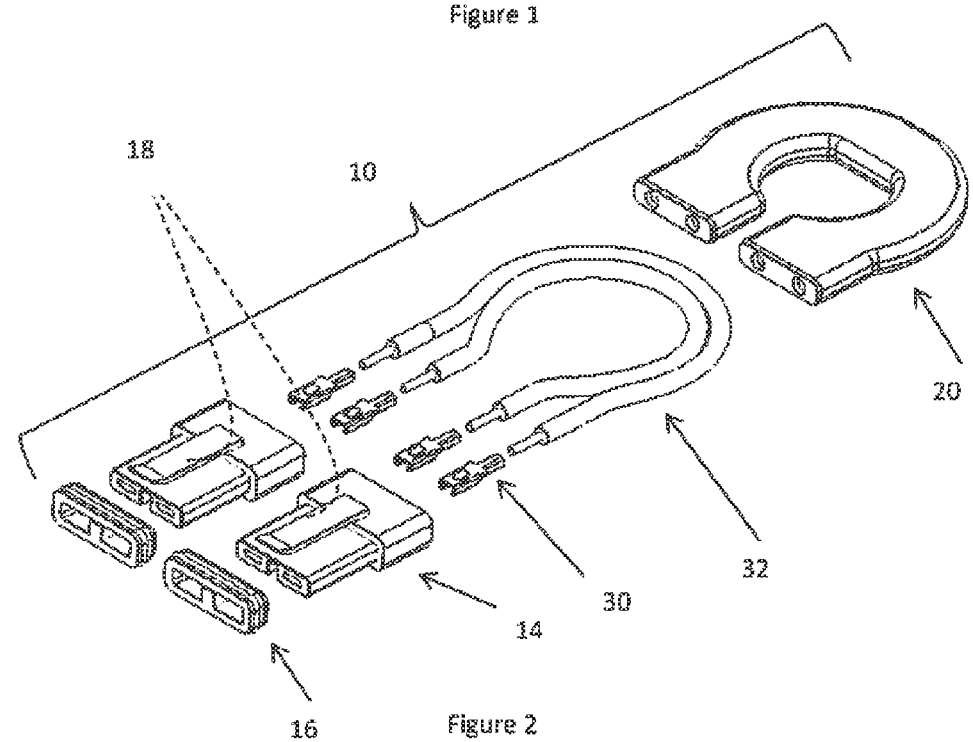
FIG. 2 illustrates an exploded view of the connector of FIG. 1.

FIG. 2 is an exploded view of a connector 10. The connector 10 includes a flexible housing 20 that has two ends that include terminal covers 14. Each of the terminal covers 14 include a locking feature 18 and a seal 16 over the terminal cover 14. The terminal covers 14 include connection ports 12 in the end so that the connector electrically connects two adjacent photovoltaic components (e.g., photovoltaic modules) (not shown). The terminal covers 14 include insulated conductors 32 and terminals 30 that extend from the flexible housing 20 so that the terminals 30 can be used to form an electrical connection between photovoltaic components. The insulated conductors 32 are formed in the shape of the flexible housing 20.

Figure 3A:
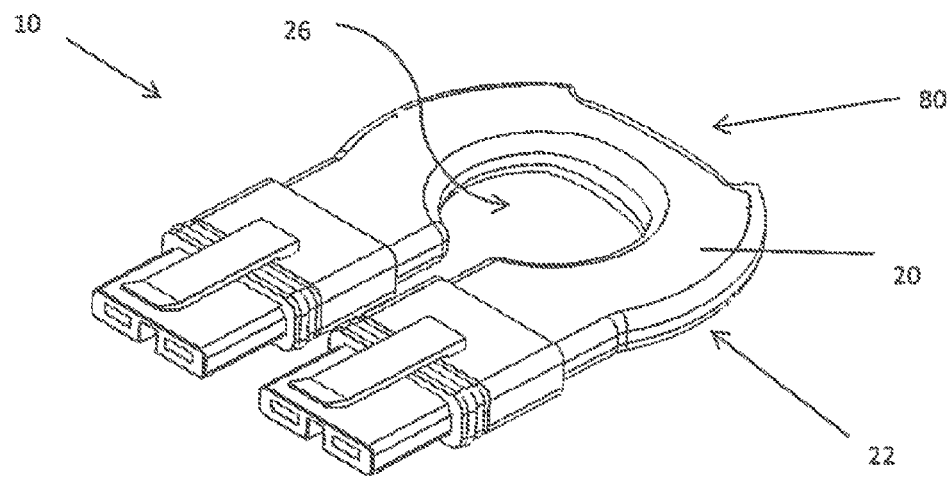
FIG. 3A illustrates a perspective view of a connector including a flexible region and a locking portion.
Figure 3B:
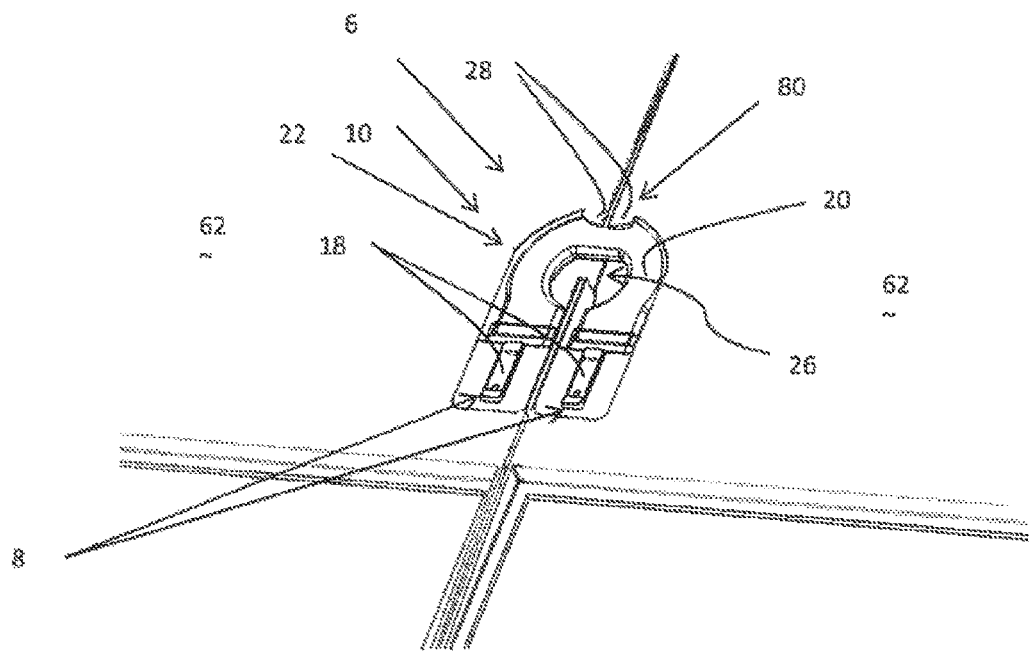
FIG. 3B illustrates an example of a connector installed in a photovoltaic component.

FIG. 3A illustrates a connector 10 including a flexible region 22 in the flexible housing 20. The flexible housing 20 includes a through-hole 26 through a central region, the through-hole 26 is generally circular in shape. The flexible housing 20 further includes locking portion 80 for connecting the flexible housing 20 directly to a solar component (not shown). FIG. 3B illustrates an alternative connector 10 having a flexible housing 20 with a flexible region 22 and a through-hole 26 having a "D" shape with one flat side. The connector 10 is located within a recess 6 of a pair of photovoltaic components 62 so that the locking portion 80 is retained within the photovoltaic components by locking portion connector 28. The connector 10 includes locking features 18 that are connected to a latching mechanism 8 of the photovoltaic components 62.

Figure 4:
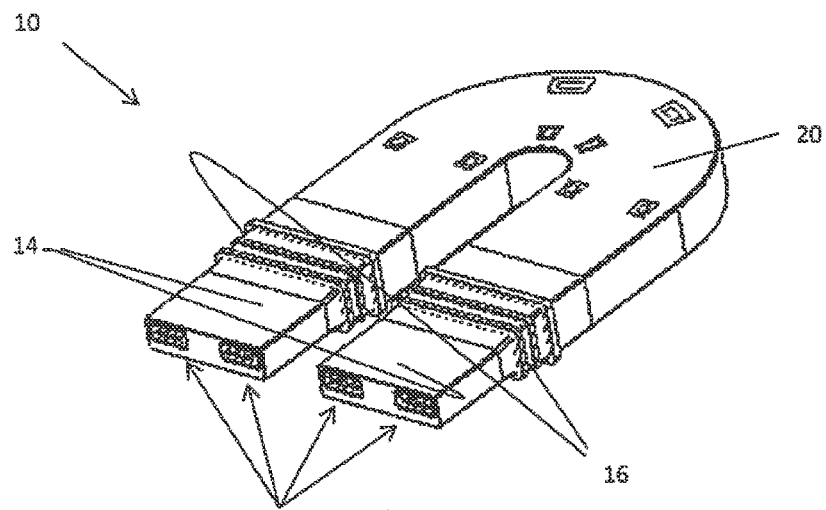
FIG. 4 illustrates a perspective view of another connector of the teachings herein.

FIG. 4 illustrates another possible connector 10 of the teachings herein with a flexible housing 20. The flexible housing 20 is generally "U" shaped and includes a pair of terminal covers 14 that include connection ports 12 on each end. The terminal covers 14 are covered by seals 16.

Figure 5:
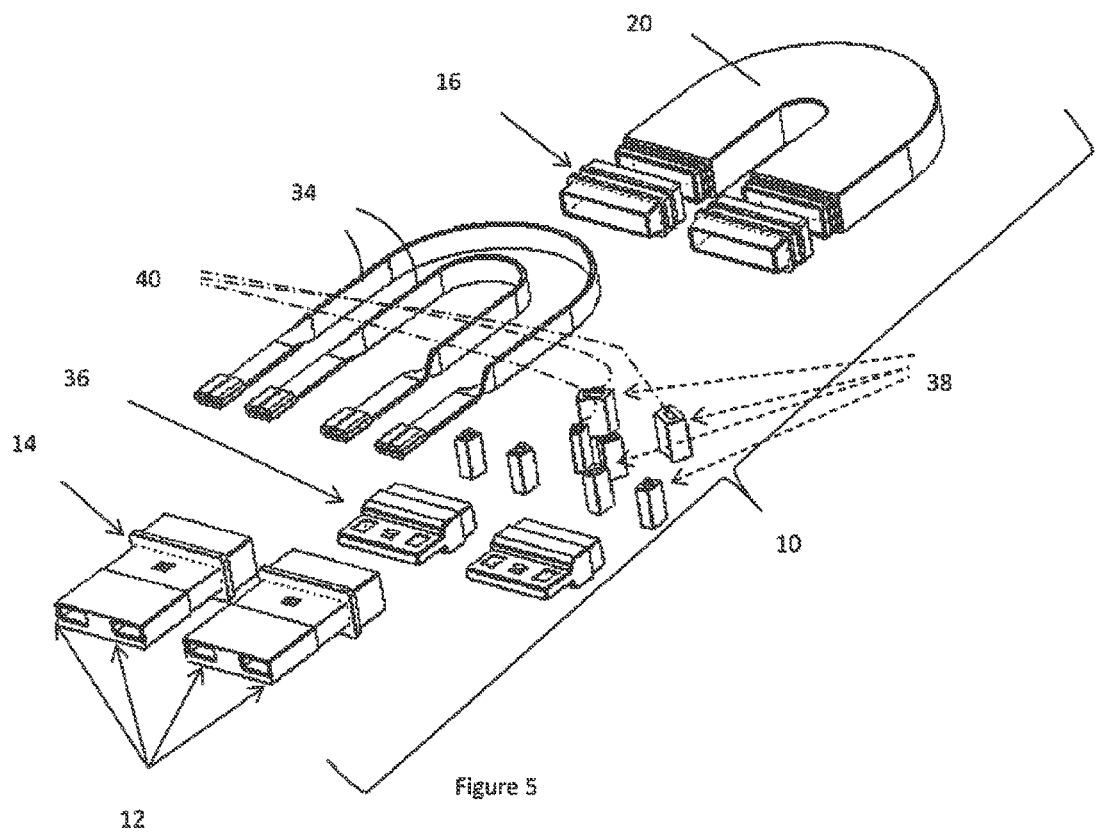
FIG. 5 illustrates an exploded view the connector of FIG. 4.

FIG. 5 is an exploded view of FIG. 4 of the teachings herein. The connector 10 has a flexible housing 20 with a terminal cover 14 on each end. Each terminal cover 14 has a seal 16. Each of the terminal covers 14 include a pair of connection ports 12. The connection ports 12 extend the length of the terminal cover 14 so that conductors and terminals can extend therethrough for forming a connection. Terminal locating features 36 are located adjacent to the flexible housing 20 and cover a portion of the integral conductor and terminal 34. Conductor locating features 38 may contain locating features 40 for positioning inside a mold cavity in a step of forming the flexible housing. The terminal locating features 36 are located proximate to the ends of the integral conductor and terminal 34. The terminal locating features 36 and conductor locating features 38 may be molded or installed onto the conductors prior to the flexible housing 20 or the terminal covers 14. The locating features (36 and 38) may aid in the positioning of the terminal covers 14, conductors 34, and flexible housing 20 with respect to each other in final assembly. As illustrated the conductors of the integral conductors and terminals 34 are flat and the terminal locating features 36 maintain the conductors so that the width of the conductor is oriented flat and the conductors as they extend out of the terminal locating features 36 are twisted so that the width is turned on end and the orientation of the conductor is maintained on end by the conductor locating features 38. The conductors are flat near the termination end and twist as the conductors curve so that the connector can be flexed during a connection without the conductors being stressed.

Figure 6A:
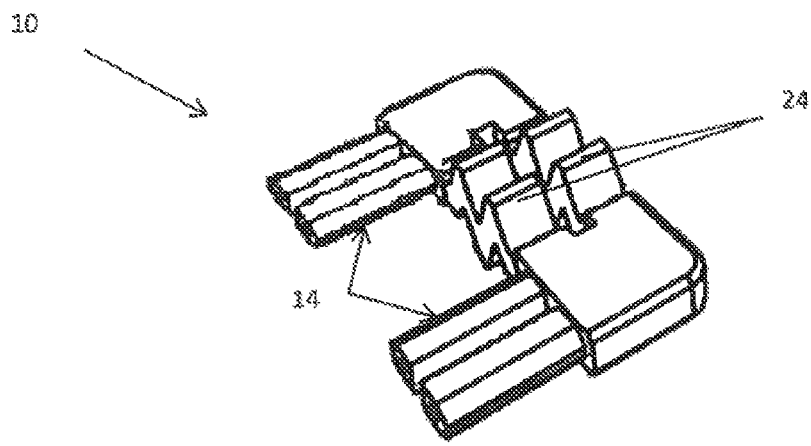
FIG. 6A illustrates another possible connector of the teachings herein.
Figure 6B:
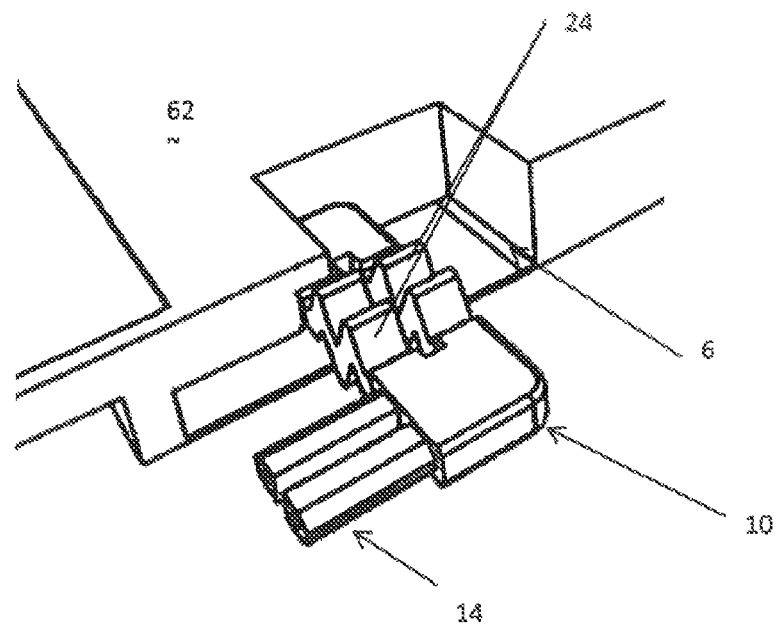
FIG. 6 illustrates the connector of FIG. 6A installed in a photovoltaic component.

FIG. 6A illustrates another alternative embodiment of the connector 10 including a a pair of terminal covers 14 connected by a relief 24 that is expandable and contactable. FIG. 6B illustrates the connector 10 of FIG. 6A installed in a recess 6 of a photovoltaic component 62. The relief 24 expands and contracts relative to the photovoltaic component 62 and terminal covers 14 during expansion and contraction.

Figure 7:
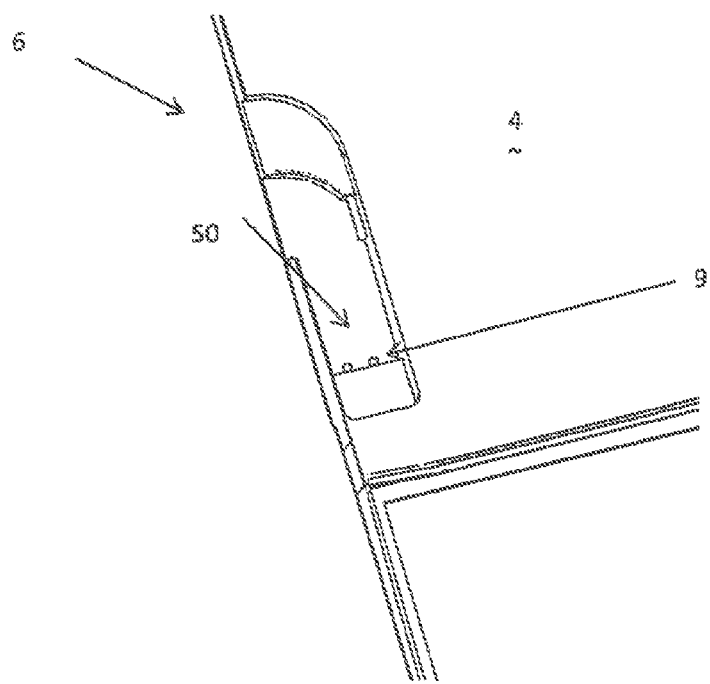
FIG. 7 illustrates an example of a partial recess in a photovoltaic component of the teachings herein.

FIG. 7 illustrates an example of a recess 6 in a photovoltaic module 4. The recess 6 includes a fluid release 9 and a connector receptor 50 for forming a connection with a connector (not shown).

Figure 8:
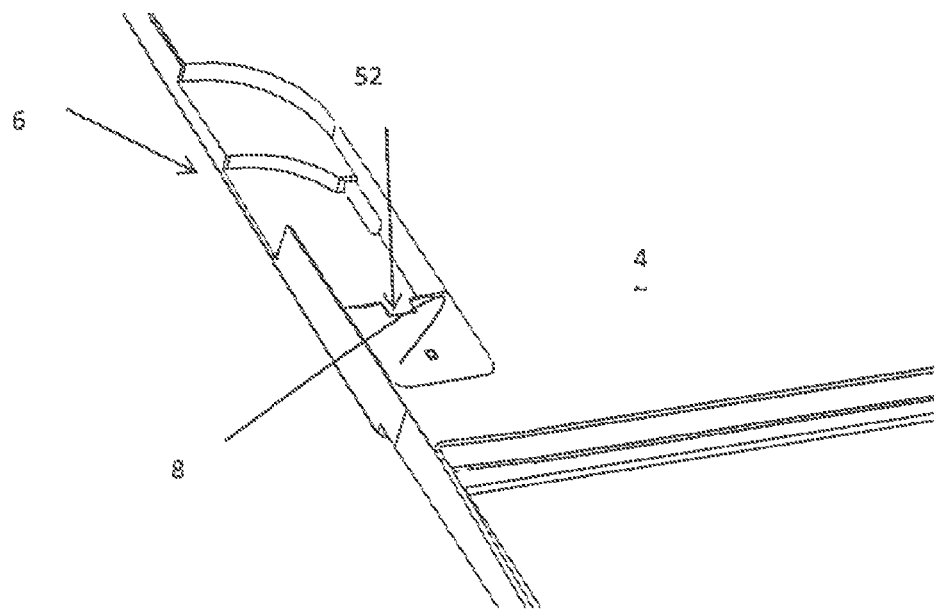
FIG. 8 illustrates another example of a partial recess in a photovoltaic component of the teachings herein.

FIG. 8 illustrates an example of a recess 6 of the teachings in a photovoltaic module 4. The recess 6 includes connection points 52 for forming an electrical connection with a connector (not shown) and a latching mechanism 8 covering the connection points 52. The latching mechanism 8 includes a hole for receiving a portion of the locking feature (not shown).

Figure 9:
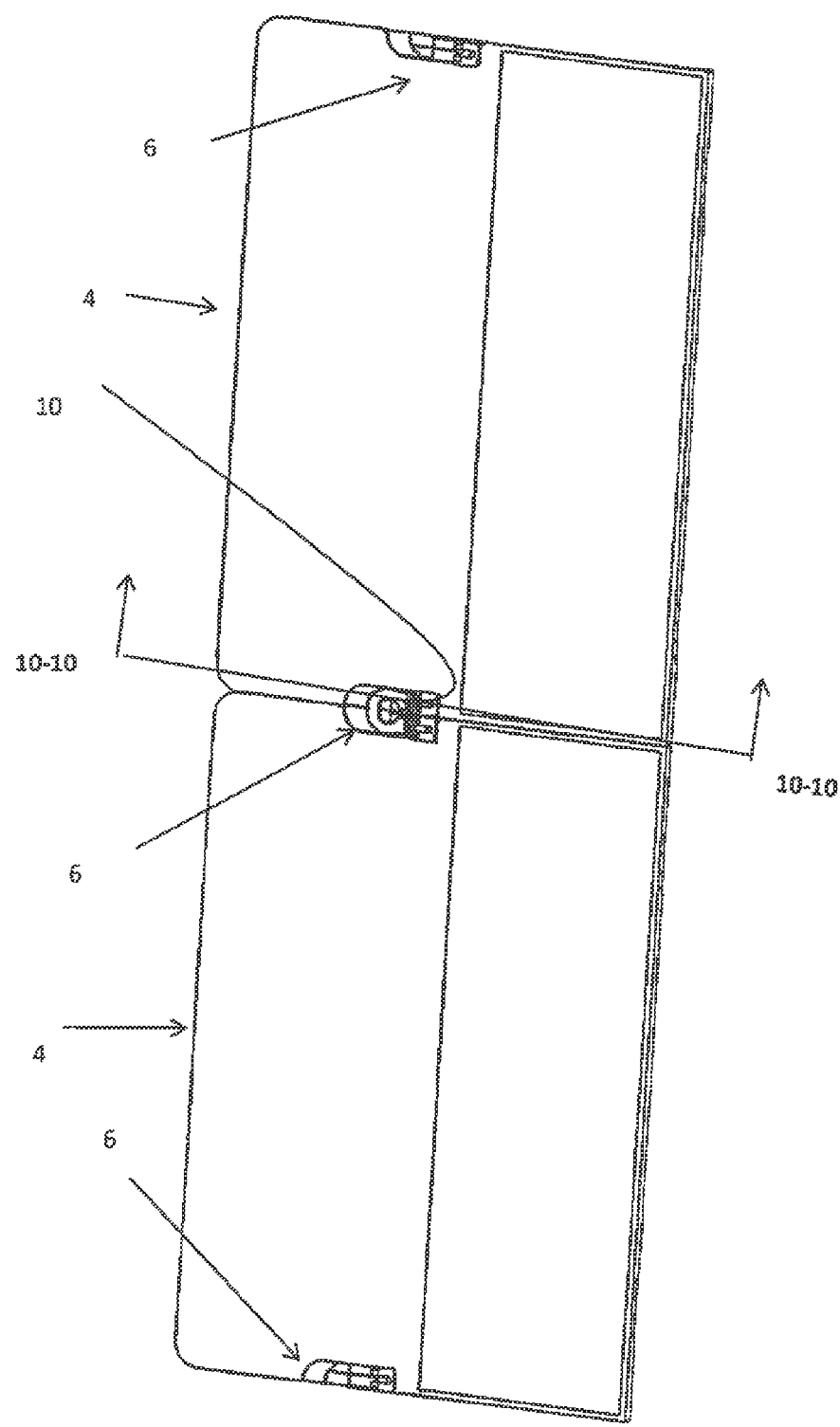
FIG. 9 illustrates a top view of two photovoltaic modules connected by a connector of the teachings herein.

FIG. 9 illustrates two photovoltaic modules 4 electrically connected together by a connector 10. As illustrated, each of the photovoltaic modules 4 includes a partial recess 6 on each edge so that when two adjacent photovoltaic modules 4 are placed in communication a full recess 6 is formed and a connector 10 can be housed in the recess 6.

Figure 10:
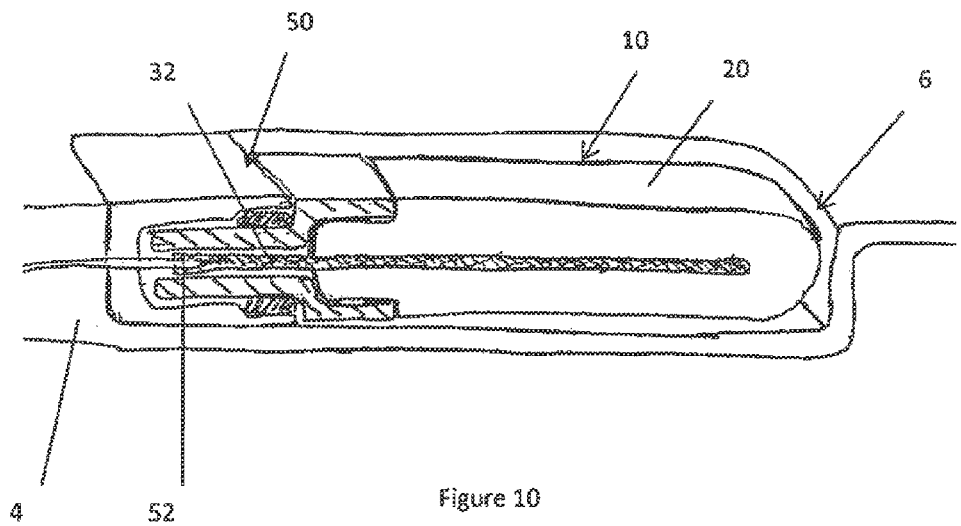
FIG. 10 illustrates a cross sectional view of FIG. 9 along lines 10-10.

FIG. 10 illustrates a cross-sectional view along lines 10-10 of FIG. 9 showing a connector 10 having a flexible housing 20 located in a recess 6 of a photovoltaic module 4. The recess 6 includes a connector receptor 50 for receiving a portion of the connector 10 so that when the connector 10 is located within the connector receptor 50 the connection points 62 contact the conductor 32 of the connector 10 forming an electrical connection.

Figure 11:
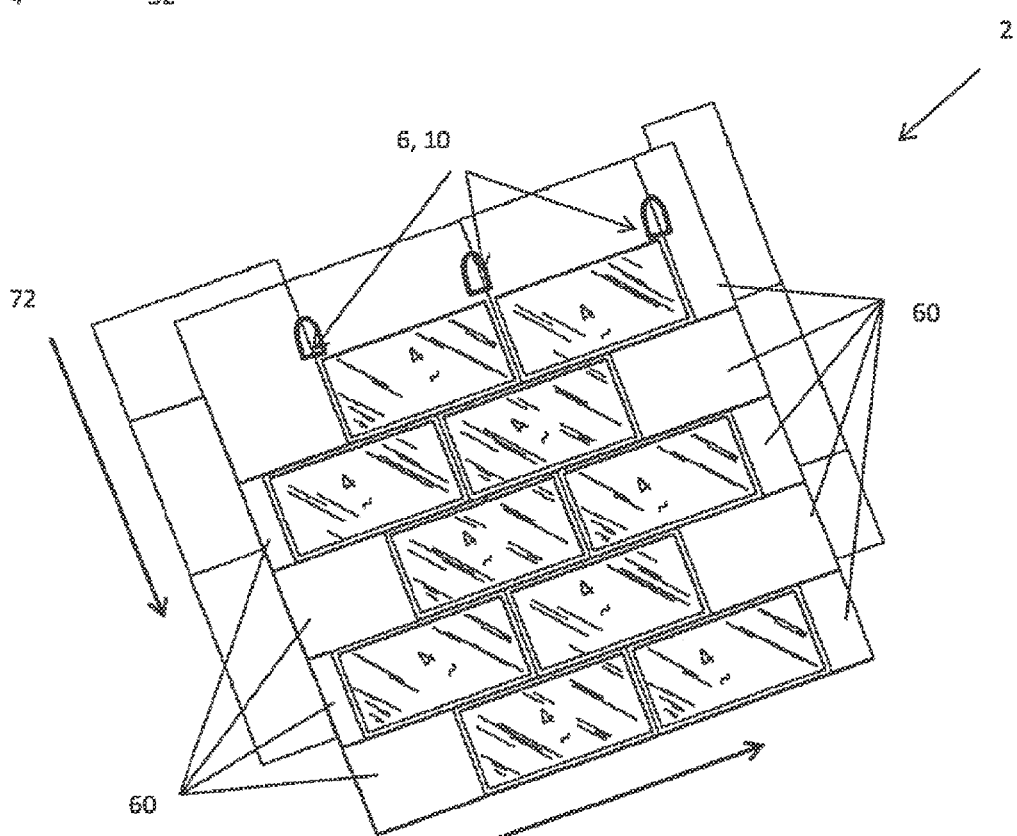
FIG. 11 illustrates a photovoltaic array.

FIG. 11 illustrates an example of a photovoltaic array 2 of the teachings herein. The photovoltaic array 2 includes a plurality of photovoltaic modules 4 connected together forming rows. The rows of photovoltaic modules 4 are connected together and extend in a first direction 70. Adjacent rows of photovoltaic modules 4 are connected together by integrated flashing pieces 60, The integrated flashing pieces 60 and the photovoltaic modules 4 are connected together by a connector 10 that is located in a recess 6 extending in a second direction 72. As illustrated, the last row of connectors 10 are visible as the previous four rows of connectors 10 are covered by an overlapping row of photovoltaic modules 4.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term may herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or one to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A photovoltaic assembly comprising:
   at least two photovoltaic components that are adjacent to each other in a first direction, each photovoltaic component comprising
   a top surface forming a plane:
   a partial recess in communication with a partial recess in an adjacent photovoltaic component, the partial recesses formed in the top surfaces of the photovoltaic components: and
   one or more connector receptors aligned in a second direction which is non-parallel to the first direction; and
   a connector located at least partially in the partial recess of the photovoltaic component and at least partially in the partial recess of the adjacent photovoltaic component so that the connector sits flush or below the plane defined by the top surfaces of the photovoltaic components, wherein the partial recess of the photovoltaic component and the partial recess of the adjacent photovoltaic component form a combined recess with a shape corresponding to a shape of the connector, the connector comprising:
   a housing having a first end and a second end, wherein the housing conforms to a predetermined shape such that the first end and the second end extend in the same direction;
   one or more connection ports at the first end;
   one or more connection ports at the second end;
   one or more flexible electrical conductors that extend from the one or more connection ports at the first end to the one or more connection ports at the second end, and
   one or more flexible regions in the housing so that the housing is a flexible housing, the one or more flexible regions being located at an apex between the first end and the second end of the housing;
   wherein the connector is flexible so that the first end and the second end are movable relative to each other in a plane, out of the plane, or both; and
   wherein the one or more connection ports at the first end and the one or more connection ports at the second end form a connection with the one or more connector receptors of the photovoltaic component and the adjacent photovoltaic component so that the connector electrically connects the photovoltaic component to the adjacent photovoltaic component.

2. The photovoltaic assembly of claim 1, wherein the first end and the second end each include a terminal cover and the terminal covers include a locking feature, and wherein the flexible housing includes a lock portion that forms a mating connection with a locking portion connector of the photovoltaic component.

3. The photovoltaic assembly of claim 1, wherein the flexible housing is sufficiently flexible so that the housing moves when in a connected state but includes enough rigidity so that the connector can be moved into the connection state by a user gripping and moving the connector via a point on the housing.

4. The photovoltaic assembly of claim 2, wherein the one or more connection ports at the first end and the one or more connection ports at the second end are sufficiently sealed by the terminal cover so that the one or more flexible electrical conductors are electrically insulated and are touch safe.

5. The photovoltaic assembly of claim 2, wherein each terminal cover includes a seal, and the seal is located on an outside of the terminal covers, an inside of the terminal covers, an inside of the one or more connector receptors, or a combination thereof.

6. The photovoltaic assembly of claim 5, wherein the one or more flexible regions are generally arcuate.

7. The photovoltaic assembly of claim 1, wherein the second direction is from about 45 degrees to about 90 degrees from the first direction.

8. The photovoltaic assembly of claim 6, wherein the one or more conductors are substantially flat in shape and a portion of the one or more conductors are twisted as the one or more conductors curve from the first end to the second end.

9. The photovoltaic assembly of claim 1, wherein the one or more conductors are at least two conductors and include one or more conductor locating features that assist in maintaining spacing between the at least two conductors so that the at least two conductors are isolated from each other.

10. The photovoltaic assembly of claim 1, wherein the photovoltaic components are a photovoltaic modules and the photovoltaic modules are connected directly to a roofing structure and provides roofing functions.

11. The photovoltaic assembly of claim 1, wherein the photovoltaic component includes a latching mechanism proximate to the connector receptor, and the connector includes a mating locking feature on the first end, the second end, or both that forms a locked connection with the latching mechanism that assists in maintaining the electrical connection between the latching mechanism of the photovoltaic component and either the connection port at the first end or the connection port at the second end, or both.

12. The photovoltaic assembly of claim 1, wherein the housing is U-shaped.

13. The photovoltaic assembly of claim 1, wherein the partial recess is covered by one or more adjacent photovoltaic components.

14. The photovoltaic assembly of claim 1, wherein the first end or the second end of the connector is integrally connected to the photovoltaic component or the adjacent photovoltaic component.

15. A photovoltaic assembly comprising:
    first and second photovoltaic components positioned adjacent to each other, each photovoltaic component including:
    a top surface forming a plane;
    a connector receptor;
    a recess aligned with a recess in an adjacent photovoltaic component, the recesses formed in the top surfaces of the photovoltaic components; and
    a connector spanning between the first and second photovoltaic components, the connector positioned at least partially within the recesses of the first and second photovoltaic components such that the connector is coplanar or located below the plane defined by the top surfaces of the photovoltaic components, wherein the partial recess of the photovoltaic component and the partial recess of the adjacent photovoltaic component form a combined recess with a shape corresponding to a shape of the connector, the connector including:
    one or more insulated conductors;
    a housing defining opposing first and second ends, wherein the insulated conductors are received within the housing and the housing is biased toward a U shaped configuration;
    one or more connection ports at each of the first and second ends, the one or more connection ports electrically connected to the one or more insulated conductors; and
    one or more flexible regions defined in the housing between the first and second ends allowing movement of the first and second ends relative to each other in a plurality of directions;
    wherein the one or more connection ports at the first end of the connector and the one or more connection ports at the second end of the connector form respective connections with the connector receptors of the first and second photovoltaic components to electrically connect the first and second photovoltaic components together.

16. The photovoltaic assembly of claim 15, wherein the recess is defined on an edge of the photovoltaic component.

17. The photovoltaic assembly of claim 16, wherein each photovoltaic component includes a recess on two opposing edges.

18. The photovoltaic assembly of claim 15, wherein the one or more flexible regions are formed as part of a flexible housing extending between the first and second ends of the connector.

19. The photovoltaic assembly of claim 18, wherein one or more electrical conductors extend between the first and second ends and within the flexible housing.

20. The photovoltaic assembly of claim 15, wherein:
    the first and second photovoltaic components are positioned adjacent to each other in a first direction; and
    the connector receptors are aligned in a second direction that is non-parallel to the first direction.

21. The photovoltaic assembly of claim 15, wherein the one or more flexible regions are located at an apex between the first and second ends of the connector.

22. The photovoltaic assembly of claim 15, wherein the one or more flexible regions allow the first and second ends of the connector to move relative to each other in a plane, out of the plane, or both.

23. A photovoltaic assembly comprising:
    first and second photovoltaic components positioned adjacent to each other, each photovoltaic component including a top surface, a connector receptor, and a recess defined on an edge of the photovoltaic component to align with a recess in an adjacent photovoltaic component, the recesses formed in the top surfaces of the photovoltaic components;
    a connector electrically connecting the first and second photovoltaic components, the connector positioned within the aligned recesses of the first and second photovoltaic components such that the connector is located at or below the top surfaces of photovoltaic components, wherein the partial recess of the photovoltaic component and the partial recess of the adjacent photovoltaic component form a combined recess with a shape corresponding to a shape of the connector, the connector including:
    opposing first and second ends;
    a connection port at each of the first and second ends;
    a flexible housing biased in a configuration where the opposing first and second ends face in the same direction and allowing movement of the first and second ends relative to each other in a plurality of directions;
    a terminal cover on each of the first and second ends;
    wherein the first and second ends of the connector form respective connections with the connector receptors of the first and second photovoltaic components to electrically connect the first and second photovoltaic components together.

* * * * *